United States Patent
Rummage

[11] Patent Number: 5,328,121
[45] Date of Patent: Jul. 12, 1994

[54] TEXTILE CORE HAVING IMPROVED START-UP GROOVE

[75] Inventor: Tony F. Rummage, Hartsville, S.C.

[73] Assignee: Sonoco Products Company, Hartsville, S.C.

[21] Appl. No.: 10,647

[22] Filed: Jan. 28, 1993

Related U.S. Application Data

[63] Continuation-in-part of Ser. No. 893,408, Jun. 3, 1992, Pat. No. 5,211,354.

[51] Int. Cl.$^5$ ............................................. B65H 75/28
[52] U.S. Cl. .................................................. 242/125.1
[58] Field of Search .............. 242/125.1, 125, 125.2, 242/125.3, 118.3, 118.32

[56] References Cited

U.S. PATENT DOCUMENTS

| | | | |
|---|---|---|---|
| 1,634,492 | 7/1927 | Dunlap | 242/118.32 |
| 2,219,836 | 10/1940 | Dunlap | 242/118.32 |
| 2,262,665 | 11/1941 | Cavanaugh | 242/125.1 |
| 3,103,305 | 9/1963 | Heatherly | 242/125.1 X |
| 3,625,451 | 12/1971 | Anderson | 242/125.1 |
| 3,717,291 | 2/1973 | Adams et al. | 242/125.1 |
| 3,876,165 | 4/1975 | Comer | 242/125.1 |
| 3,952,179 | 4/1976 | Baker | 219/69.17 |
| 3,967,795 | 7/1976 | Shindo et al. | 242/125.1 |
| 3,986,680 | 10/1976 | Cardell | 242/125.1 |
| 4,057,201 | 11/1977 | Wilkinson | 242/125.1 |
| 4,369,933 | 1/1983 | Bedenbaugh | 242/125.1 |
| 4,371,130 | 2/1983 | Case | 242/125.1 |
| 4,842,213 | 6/1989 | Bärtschi et al. | 242/125.1 |
| 4,907,758 | 3/1990 | Powel et al. | 242/125.1 |
| 5,029,762 | 7/1991 | Behrens et al. | 242/125.1 |

FOREIGN PATENT DOCUMENTS

| | | | |
|---|---|---|---|
| 2647544 | 4/1978 | Fed. Rep. of Germany | 242/125.1 |
| 3923305 | 2/1990 | Fed. Rep. of Germany | 242/125.1 |
| 145087 | 7/1986 | Japan | 242/125.1 |
| 60783 | 3/1987 | Japan | 242/125.1 |

*Primary Examiner*—Stanley N. Gilreath
*Attorney, Agent, or Firm*—Bell, Seltzer, Park & Gibson

[57] ABSTRACT

The invention provides textile cores having improved start-up grooves. In a preferred embodiment the start-up groove has a generally V shaped cross-section and at least one longitudinal portion of the groove, preferably the trailing portion of the groove, has at least one compound angle sidewall defined in longitudinal cross-section by a plurality of alternating, substantially rectangular tongue and notch sections extending along the sidewall. In accordance with another aspect of the invention, improved grooving blades for textile cores are formed using an electric discharge machining (EDM) process.

14 Claims, 5 Drawing Sheets

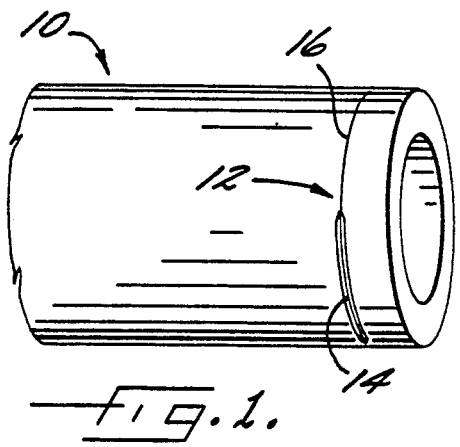
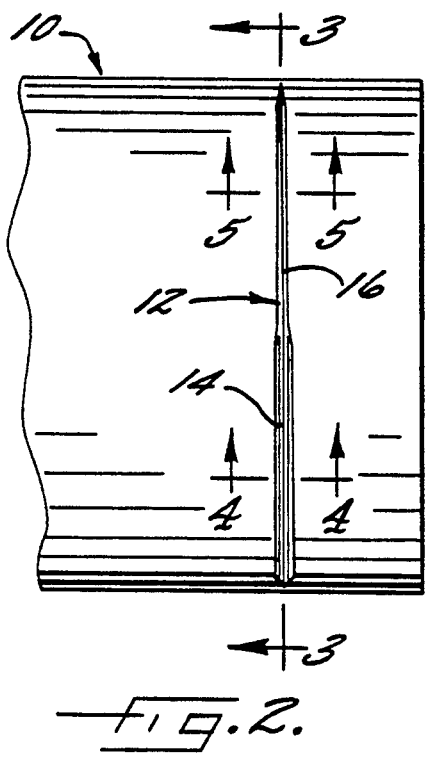
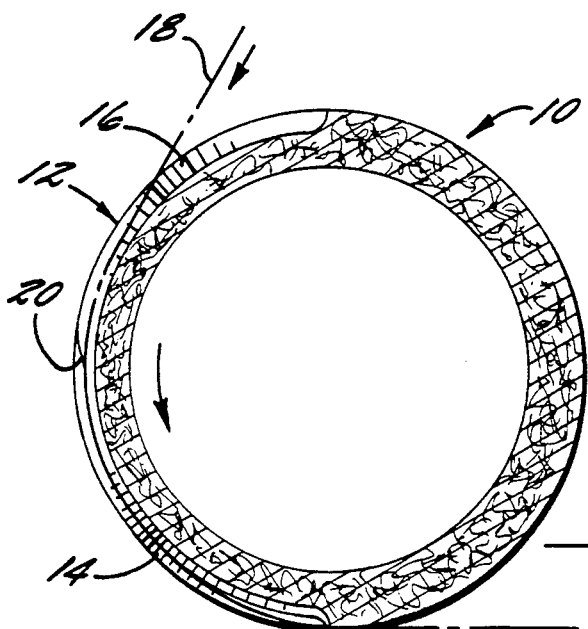
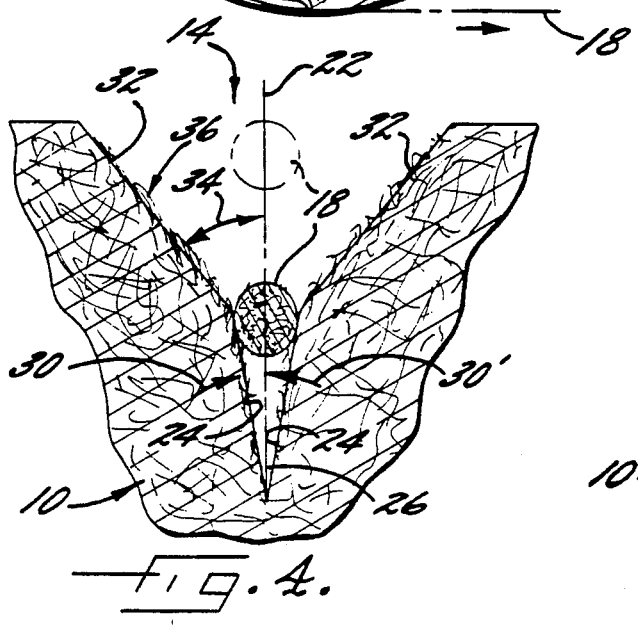

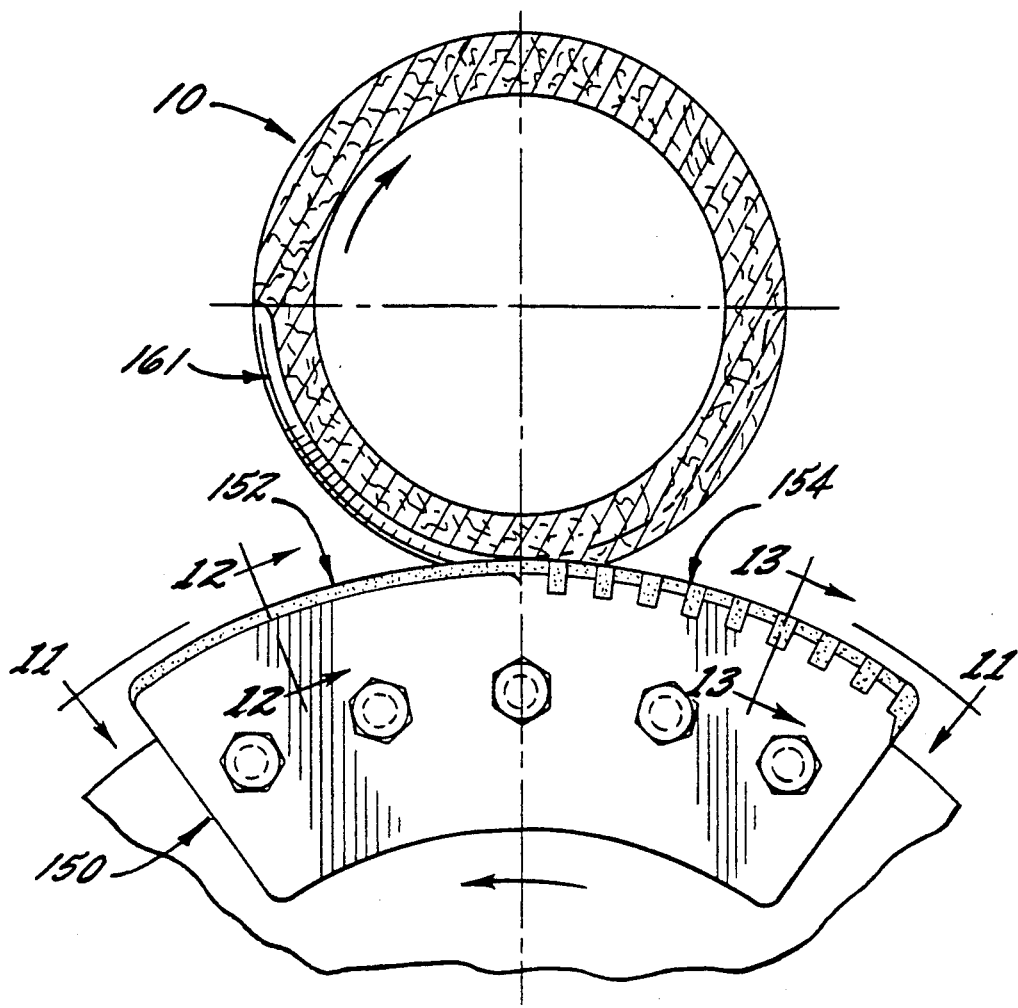
Fig. 10.
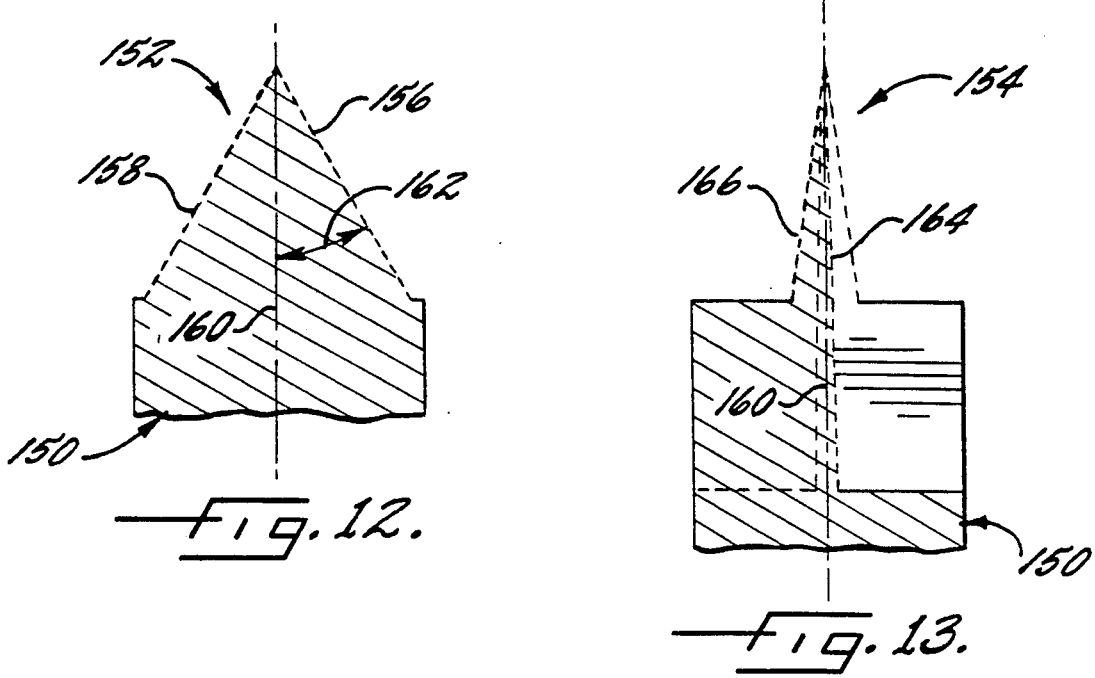
Fig. 12.
Fig. 13.

TEXTILE CORE HAVING IMPROVED START-UP GROOVE

This application is a continuation-in-part of U.S. Pat. application Ser. No. 07/893,408, filed Jun. 3, 1992 by Tony F. Rummage and titled "Textile Core Having Improved Start-Up Groove", now U.S. Pat. No. 5,211,354.

FIELD OF THE INVENTION

The invention is directed to an improved textile core of the type comprising an elongate tubular body having a circumferential groove for gripping an incoming yarn line for wind-up on the core. In addition, the invention is directed to improved grooving blades for forming start-up grooves in textile cores and to processes for forming grooving blades having compound or multiple compound surfaces and/or a roughened exterior surface capable of providing a matte finish on the surface of the circumferential start-up groove in the textile core.

BACKGROUND OF THE INVENTION

Textile yarn cores, i.e., yarn carriers or bobbins, are employed in the textile industry for winding and supporting yarn packages. In the package forming process, a moving yarn line is strung up onto a rapidly rotating empty core. In the manual string-up process, the moving yarn line is usually held by an aspirator gun and the yarn line brought into tangential contact with the rotating empty core. Typically, a start-up groove is provided in the surface of the core, normally adjacent to one end of the core. The yarn line is manually directed by movement of the aspirator gun into the groove which grips the yarn line thereby initiating the wind-up process.

Newer winder technologies provide for the string-up process to be automatically initiated without manual intervention. For example with turret-type winders, an empty yarn core is moved from a waiting position to a winding position when a fully wound yarn package is formed on another position on the apparatus. The empty core is rotated rapidly and moved into tangential contact with the thread line being wound on the other, now full, yarn package. This initiates string-up for the empty core and terminates winding for the fully wound core. For this automated process to work effectively, the start-up groove on the empty core must readily and reliably catch the incoming yarn line without operator intervention.

Multiple width start-up grooves in yarn cores have been provided in an effort to improve the yarn pick up propensities of the yarn groove. In the multiple width pick up grooves, one longitudinal, i.e., lengthwise, portion of the groove is relatively wide while an adjacent longitudinal portion is relatively narrow. The core is rotated so that the wide portion of the groove forms the leading portion; the narrow portion of the groove forms the trailing portion. The transition portion of the groove then forms a "nip" for gripping and catching of the yarn.

A textile core having such a double width groove and the process for forming it are disclosed in U.S. Pat. No. 3,103,305 to Heatherly. The grooves formed according to the disclosure of this patent have a generally V shaped cross-section with the sides of the groove being curved convexly inwardly towards each other. This groove configuration is said to permit the yarn to find its proper maximum position for sliding through the wide, lead-in portion of the groove while acting with maximum efficiency to catch, hold and sever the yarn as it is pulled into the nip while raising to a higher level in the narrow portion of the groove.

Universal pick up grooves for textile cores are disclosed in U.S. Pat. No. 4,369,933 to Bedenbaugh and U.S. Pat. No. 4,371,130 to Case. The pick-up grooves described in these patents include wide lead-in portions and adjacent narrow gripping portions. Two wide lead-in longitudinal groove portions are provided, one on each end of the narrow longitudinal portion of the pick-up groove so that the tube can be rotated in either direction while providing the wide, lead-in portion of the groove at the leading edge of the groove. The disclosure of these patents is hereby incorporated herein by reference.

Textile cores having a double taper or compound start-up groove are disclosed in U.S. Pat. No. 3,717,291 to Adams, et al. which is hereby incorporated by reference. The compound angle start-up groove is advantageously formed in the core using a compound angle cutting blade. In transverse cross-section, the compound angle cutting blade is defined by a narrow angle portion at the cutting tip of the blade and a wider angle portion spaced from the cutting tip. The resultant double taper groove in the yarn tube is wider and has a greater angle taper adjacent the surface of the tube, and is narrower, with a narrower taper at the bottom of the groove. A "pinch point" for the incoming yarn line is formed by the narrow tapering portion of the groove at the bottom of the groove.

In practice, the double-taper blades employed in the above-described Adams, et al. patent are typically ground on an abrasive stone-type grinder to achieve the proper tapers. The blade manufacturing process is relatively complicated and time consuming. In addition, care must be exercised during the grinding process in order not to adversely affect the temper of the metal of the grooving blade.

U.S. Pat. No. 5,029,762 to Behrens is directed to a yarn winding apparatus and method and discloses yarn catching slots which are said to be particularly useful in connection with winders wherein the surface of an empty yarn core or tube, and the yarn, move in the same direction at the time when the yarn is strung up on the empty core. In the embodiment illustrated in FIG. 11 of this patent, a portion of the start-up groove is shaped so that each wall includes sawtooth-like projecting radial edges. The radial edges on the opposed walls are displaced relative to each other, i.e. the edges are staggered. The spacing between opposed sawtooth like projecting radial edges is smaller than the yarn thickness and can be zero or negative. An identical start-up groove is disclosed in German Offenlegungsschrift DE 3923305 A1, published Jun. 11, 1990. As shown in FIGS. 8A and 8B thereof and described in the specification thereof, the edges of the sawtooth-like projections are said to form tongues projecting into the axial center of the catch-thread slot to act as thread traps. The groove was said to be made by punching a suitable tool into the surface of the yarn tube. A related start-up groove is illustrated in FIGS. 7A and 7B of this publication which is formed by first punching a series of circumferentially arranged holes into the surface of the tube and thereafter cutting into the surface of the tube a slot intersecting the previously formed holes. A further related start-up groove is shown in FIGS. 6 and 6A wherein notches are made in the surface of the tube transverse to the catch-thread slot. The notches are said to give rise to paper tongues for forming a trap for engaging an incoming thread line.

The yarn start-up grooves disclosed in the above described German patent publication and in the Behrens, et al. patent, are said to be formed in paperboard textile cores by pressing one or more appropriately shaped tools into the surface of the core. However, in practice, irregularly shaped start-up grooves, such as those described above, tend to loose their shape because the slot is impressed into the paperboard core and no material is removed from the core during the slot-forming process. As a result the slot is defined by compressed paperboard areas adjacent the slot. Over time, these compressed areas adjacent the groove tend to expand due to the tendency of the paperboard material to spring back into its original shape as a result of moisture regain and the natural resiliency of the paperboard fibers. Moreover, the compound shaped grooves described above can require the use of specially shaped cutting blades which are difficult to form in practice and/or multiple cutting operations are required using multiple tools in order to form the start-up grooves. In addition to the difficulties in forming the grooves, and/or the cutting tools used to form the grooves, it has been found in practice that notched grooves, such as those shown in FIGS. 6A and 6B of the above Germany patent publication can be difficult to use reliably, particularly in high speed winding processes employing automated string-up turret-type winders, and when used for high denier yarns, such as continuous, multifilament industrial yarns.

In the textile industry, yarn manufacturing and wind-up speeds have continually increased. Moreover, in many cases, yarn properties including yarn strengths have increased. As yarn manufacturing speeds have increased, the need for improved gripping action by the start-up groove in the textile cores has also increased. Moreover, in the case of automated string-up winders, the gripping action of the start-up groove must be extremely reliable so that the yarn line can be readily gripped and severed without operator intervention. However, it has been found that conventionally formed start-up grooves in textile yarn cores do not always reliably and repeatably perform these functions, particularly when used with different sized yarns, yarns of different strengths and/or with automated winding apparatus of high speeds.

Because of these and other difficulties associated with start-up grooves in textile cores, there are in excess of 100 different groove configurations in use commercially. In general, the grooves are V-shaped and can vary by having both sidewalls tapered, or only a single wall tapered, and/or the angle of taper on the sidewall or sidewalls can be varied. In addition, the entire groove can be formed at an angle with respect to the peripheral surface of the textile core, either in the "outboard" direction (i.e. the groove is slanted toward the direction of the end of the textile core) or in the "inboard" direction (rotation in the direction of the middle of the textile cord). Such widely varying groove shapes and configurations are necessary due to varying yarn deniers and strengths and due to variations in operations of commercially available winding apparatus. Moreover, the compound shaped and notched grooves described above add further start-up groove specifications to those commercially available. The manufacture and stocking of textile cores having such numerous groove configurations decreases manufacturing efficiencies and increases manufacturing costs for the textile core manufacturing industry.

SUMMARY OF THE INVENTION

In the parent of this application U.S. Ser. No. 07/893,408, now U.S. Pat. No. 5,211,354 certain textile cores having improved start-up grooves are disclosed, as are improved processes for forming them. The present invention provides further textile cores having improved start-up grooves which can be readily formed in a single operation and which are capable of improved engagement of incoming yarn lines of various sizes. The improved start-up grooves of the invention include compound surfaces in longitudinal cross-section such that there are alternating tongues and notches on a portion of at least one sidewall of the start-up groove. The tongues extend into the start-up groove for improved grasping of the incoming yarn line. The improved textile cores of the invention are capable of engaging various different sized yarns with no or minimal modification of the new start-up groove configuration, with the advantageous result that the number of different groove configurations for varying yarn sizes can be decreased. Yarn cores provided according to this invention or according to the parent application hereof, U.S. Ser. No. 07/893,048, now U.S. Pat. No. 5,211,354 can be manufactured in accordance with another aspect of the invention using an appropriate compound angled edge knife blades which are prepared according to another aspect of the invention using an electric discharge machining (EDM) process. The EDM process can readily provide compound, and multiple compound cutting surface knife blades and, in addition, can provide knife blades capable of providing a textured or matte finish on the inside surface of the start-up groove for improved grasping of the in-coming yarn line. In addition, the EDM manufacturing process provides significant benefits and advantages as compared to conventional grinding processes for preparing conventional ground surface grooving blades.

In one aspect of the invention textile yarn cores are provided having an elongate tubular body formed of paperboard, or the like and have a substantially cylindrical groove for gripping an incoming yarn line formed in at least a portion of the periphery of the tubular body adjacent one end thereof. The groove has a generally V shaped cross-section including an open top, a closed bottom and two sidewalls disposed on opposite sides of a center line extending radially into the tubular body. At least one longitudinal portion of the groove, preferably the trailing portion of the groove, has at least a first compound sidewall defined in longitudinal cross-section by a plurality of alternating, substantially rectangularly shaped, tongue and notch sections extending along the sidewall. Each of the tongue sections comprise a front wall which forms a portion of the sidewall of the groove and each of the tongue sections additionally include at least one sidewall extending substantially transversely into the groove for engaging the incoming yarn line. Preferably, both sidewalls of this portion of the groove include alternating tongue and notch sections and it is also preferred that the tongue and notch sections on the first sidewall are staggered with respect to the tongue and notch sections on the second sidewall. Thus, the tongue sections on the first sidewall are advantageously positioned in opposed relationship to the notch sections on the second sidewall and vice versa. It is also preferred that the tongue sections have a longitudinal length which is less than that of the opposed notch sections on the opposite sidewall. In addition, it is preferred that a second, leading portion of the groove, be a simple tapered groove of relatively wide taper, for example, wherein each sidewall is disposed at an angle of up to about 35° with respect to the center line of the groove.

The improved textile yarn cores of the invention can readily grasp incoming yarn lines of various deniers and strengths even at high speeds and even when employing sophisticated winding apparatus such as new counter-rotating auto-winding turret-type winders which effect automated string-up. In general, it has been found that the tongues along each of the sidewalls of the groove provide leading edges or corners, resulting from the sidewalls of the tongues, which are transversely oriented with respect to the groove. These leading edges, particularly when positioned on both of the sidewalls, have been found to efficiently catch and snag textile and/or industrial yarns presented to the groove during the string-up process even when automated string-up high speed winders are employed.

In another aspect, the invention provides an improved process for forming a textile core grooving blade having a compound, elongate cutting surface on an elongate peripheral edge of the blade body. According to this aspect of the invention, an EDM forming die of predetermined compound shape is placed adjacent the peripheral edge of the blade body and a pulsed DC current is applied between the forming die and the blade body for generating a plurality of destructive sparks capable of vaporizing portions of the surface of the blade body. The compound cutting surface formed on the blade body can include compound cutting surfaces along the vertically transverse cross-section of the blade body and/or compound cutting surfaces along the transverse, longitudinal cross-section of the blade body. In addition, the process of the invention for forming textile core grooving blades can be controlled to provide a cutting surface having a predetermined roughness for forming a matte on the surface of a circumferential groove in a textile core. This process for forming textile core grooving blades can readily be employed to provide compound cutting surface grooving blades for forming grooves for textile cores according to the present invention, and to provide compound cutting surface blades for forming grooves in textile cores of the parent application of the present invention, U.S. Ser. No. 07/893,408, now U.S. Pat. No. 5,211,354.

The use of the EDM process for forming grooving blades according to the invention can provide a much faster manufacturing process as compared to the grinding process used in the prior art. In addition, minor differences in the cutting surfaces between different blades can be substantially minimized or eliminated. Moreover, the temper of the metal of the grooving blade is not adversely effected by the EDM forming process. This is especially significant in connection with grooving blades having many different cutting surfaces and wherein the multiple grinding process steps employed according to prior art grinding process were both time consuming and substantially increased the likelihood of adversely affecting the blade temper during the multiple grinding process steps.

In still another aspect of the invention, improved grooving blades are provided for forming grooves in textile cores. In one embodiment of this aspect of the invention, grooving blades are provided for forming textile cores of U.S. Pat. application 07/893,408 of Tony F. Rummage, now U.S. Pat. No. 5,211,354. Such grooving blades have a peripheral cutting surface comprising a compound cutting surface on at least one side of the blade body and which is defined in vertical, transverse cross-section by a first cutting surface adjacent the outer tip of the blade which forms a first predetermined acute angle with respect to the blade body, and a second cutting surface spaced from the outer cutting tip of the blade, adjacent the first cutting surface and defining a second predetermined acute angle with respect to the plane of the blade body. The second predetermined acute angle is greater than the first predetermined acute angle. The compound cutting surface has a predetermined roughness on its exterior for forming a matte finish on the surface of a groove in a textile core. In another embodiment of this aspect of the invention, improved grooving blades are provided for forming the tongue and notch configuration start-up groove for textile cores of the present invention.

Improved textile cores according to the invention are more readily capable of grasping an incoming textile or industrial yarn, thereby initiating the start-up process, with a variety of different denier and strength yarns and with a variety of wind-up machinery. The EDM process can readily form knife blades having longitudinally and/or vertical compound cutting surfaces. In addition, the EDM process can readily form knife blades having different cutting surface configurations on different longitudinal portions of the knife blade. Such blades, in turn, can provide multiple width yarn grooves, i.e., having different widths and/or configurations in the leading and trailing longitudinal portions of the groove, in a single operation. Thus, textile cores according to the invention can have improved start-up grooves as compared to prior art cores; yet, the blades for forming the grooves can be more readily and simply prepared as compared to prior art blade manufacturing processes. And, these grooving blades can include substantial advantages as compared to prior art grooving blades.

BRIEF DESCRIPTION OF THE DRAWINGS

In the drawings which form a portion of the original disclosure of the invention:

FIG. 1 is a fragmentary prospective view of the textile core according to U.S. patent application Ser. No. 07/893,408 of Tony F. Rummage, now U.S. Pat. No. 5,211,354, taken at one end thereof to illustrate the preferred multiple width start-up groove;

FIG. 2 is a fragmentary front plan view of the yarn core of FIG. 1 illustrating the preferred start-up groove in greater detail;

FIG. 3 is a cross-section view taken along line 3—3 of FIG. 2 and illustrates in cross-section the preferred yarn start-up groove of the invention;

FIG. 4 is a fragmentary cross sectional view taken along line 4—4 of FIG. 2 and illustrates the generally V shaped compound angle cross section of the leading end of the groove and the roughened surface thereon according to the invention;

FIG. 5 is a fragmentary cross-sectional view taken along line 5—5 of FIG. 2 and illustrates the cross-section of the trailing end of the start-up groove shown in FIG. 2;

FIG. 10 illustrates a preferred multiple width groove forming process used according to the invention wherein a grooving blade having a longitudinally compound blade surface on one longitudinal portion thereof and a simple, single angle blade surface on another portion thereof, is employed for forming the start-up groove;

FIG. 12 is a fragmentary enlarged cross-sectional view taken along line 12—12 of FIG. 10 and illustrates the simple angle blade surface used to form the leading end of the yarn groove;

FIG. 13 is a fragmentary enlarged cross-sectional view taken along line 13—13 of FIG. 10 and illustrates the longitudinally compound cutting blade surface of the blade of FIG. 10;

DETAILED DESCRIPTION OF THE PREFERRED EMBODIMENT

Figure 6:
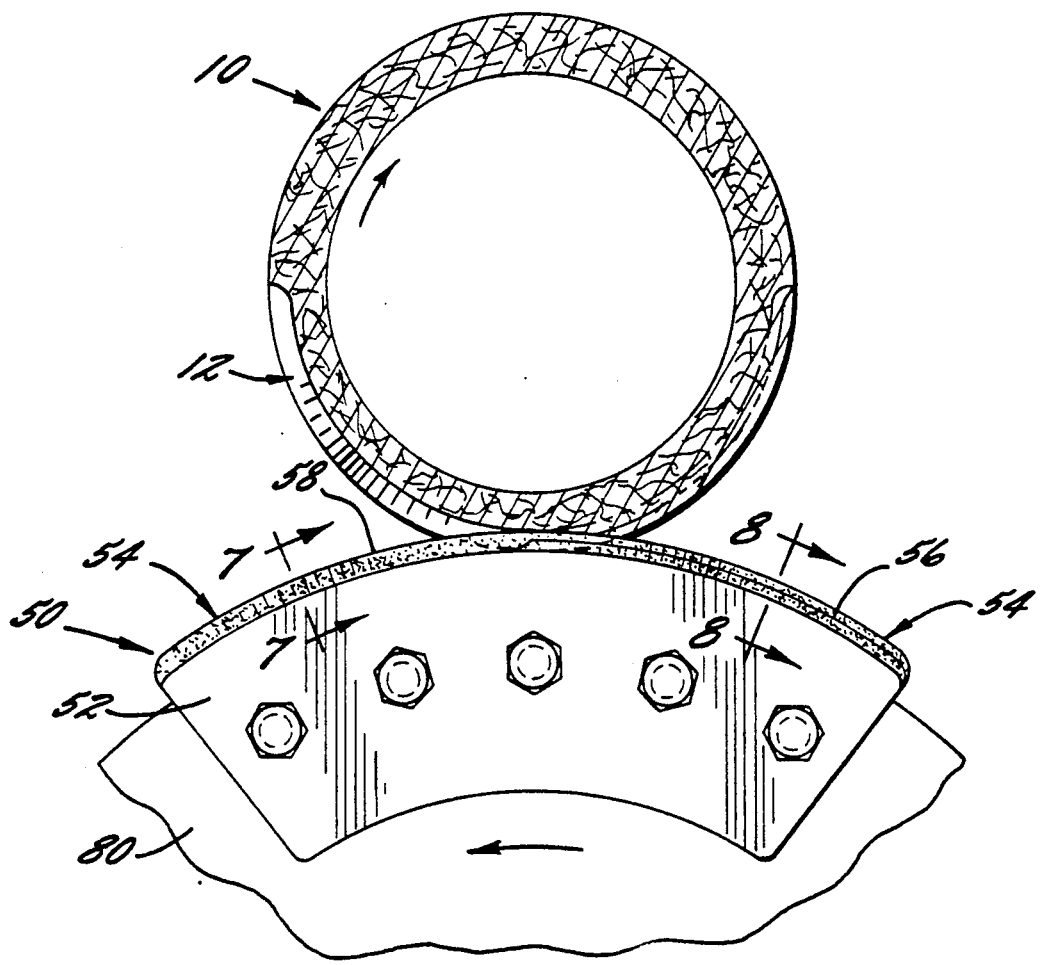
FIG. 6 illustrates a preferred multiple width groove forming process used according to the invention wherein a grooving blade having a roughened compound blade surface on one portion thereof and a roughened blade of a simple, single angle surface on another portion thereof is employed for forming the start-up groove.

In the following, preferred embodiments of the invention are described in detail. It will be recognized that although specific terms are used in describing the invention, these are used in the descriptive sense only and not for purposes of limitation. Moreover, it will be apparent that the invention is suspectable to numerous alterations, variations and modifications within its scope.

FIGS. 1, 2 and 3 illustrate the preferred textile core 10 according to U.S. Ser. No. 07/893,408, now U.S. Pat. No. 5,211,354 which includes a multiple width start-up groove 12. The core 10 is a tubular body formed from paperboard, e.g., spirally wound paperboard, plastic or the like. Although illustrated as having a cylindrical shape, it will be apparent that the tubular body could also have a frustroconical, spool-like shape or other shape. Typically a cylindrical textile core will have an outside diameter of from about two inches up to about seven inches, and a wall thickness of from about one-sixth inch up to about one-half inch.

The multiple width start-up groove 12 in core 10 includes a wide lead-in longitudinal portion 14 and a narrower trailing end longitudinal portion 16. As generally indicated schematically in FIG. 3, a moving yarn line 18 is contacted first with the lead-in portion 14 of groove 12 and thereafter with the narrower trailing end portion 16 of groove 12. As the yarn line 18 encounters the nip 20 between the wider and narrower portions of the groove 12, the yarn line is gripped by the groove and severed for initiation of winding of the yarn line 18 onto the core 10.

As best seen in FIG. 3, the groove 12 extends around about 180°, or about half the periphery of tube 10. The lead-in portion 14 of the groove constitutes about one half of the total groove while the trailing end portion 16 of the groove constitutes the other half of the groove. It will be apparent to the skilled artisan that the total length of the groove 12 can be greater or less than one half the periphery of the tube 10. Generally, it is preferred that the groove not extend around the full periphery of the tube so that the strength of the tube is not weakened. However, the length of the groove can readily be extended if desired. It is also seen that the length of the wider lead-in portion of the groove 14 and the narrower trailing end portion of the groove 16 are roughly the same. This relationship can also be varied if desired. In addition, two wider, lead-in longitudinal groove portions 14 can be provided, one on each end of the narrower portion 16 of the groove as explained in greater detail in the aforementioned U.S. Pat. No. 4,369,933 to Bedenbaugh and U.S. Pat. No. 4,371,130 to Case.

FIGS. 4 and 5 illustrate, respectively, the cross-sections of the wider, lead-in portion of the groove 14 and the narrower trailing end portion of the groove 16. In cross section, the wider lead-in portion of groove 14 is generally V shaped and has two sidewalls disposed on opposite sides of a center line 22 which extends radially into the tubular body 10. Each of the sidewalls are compound sidewalls having a first surface 24 extending upwardly from the bottom 26 of the groove and forming an acute angle with the center line as indicated by arrows 30 and 30'. A second surface 32 of each compound sidewall extends downwardly from the top of the groove 14 and defines a second predetermined acute angle with axis 22 of groove 14 as indicated by line 34. As shown in exaggerated detail in FIG. 4, the surfaces of both compound sidewalls of groove 14 have a roughened, matte finish as generally indicated by the fibers 36 on the surface of the sidewalls.

Advantageously, the angle formed between the bottom portion 24 of the compound sidewall and the center line 22 of the groove can range from less than about 5° up to about 15°, preferably 5° to 10°, while the angle formed between the upper portion of the sidewall 32 and the center line 22 can range from less than about 15° up to about 45°, preferably from about 25° to about 35°. These ranges are preferred when both sidewalls of the groove 14 are angled, i.e., tapered, with respect to the center line 22. In some cases, one sidewall may be an essentially vertical sidewall and only the other of the sidewalls will be an angled wall. In the event that only one of the sidewalls is an angled, compound sidewall, then the angles formed by the bottom wall portion and the top wall portion with the center line will typically be greater than described above. In such event, the angle formed by the bottom wall portion with the center line 22 of groove 14 will typically range from about 5° to about 30°, preferably from about 10° to about 20° while the angle formed between upper sidewall 32 and the center line 22 will range from about less than 30° up to 75°, preferably from about 45° to about 75°. It is preferred that both sidewalls have a textured surface; however, if desired, only one of the sidewalls can have a roughened or textured surface.

The compound angle groove illustrated in FIG. 4 is believed to readily accommodate yarns having any of various counts or deniers, ranging, for example on the denier scale, from 30 denier or less up to 2,000 denier or greater. In this regard, the wider portion of the groove at the top thereof is able to receive and grip larger yarns while the narrower portion of the groove, at the bottom thereof is capable of receiving and gripping smaller size yarns. Because the inside surface of the groove is roughened or textured, the yarn is more readily gripped by the groove as compared to previous start-up grooves having a smooth interior surface.

The cross-section of the narrower portion 16 of the groove 12 is seen in FIG. 5. Advantageously, this groove portion includes two simple or straight angled walls 40, each of which form an acute angle with center line 22 of the groove 16 as generally indicated by arrows 41 and 41'. Typically, when there are two angled sidewalls as illustrated in FIG. 5, the angle formed by each sidewall and the center line 22 will range from less than about 5°, up to about 20°, preferably from about 5° to about 10°. If only one sidewall is angled, then the angle formed by the sidewall and the center line of the groove will range from about 10° up to about 45°, preferably from about 10° to about 20°. As illustrated in FIG. 5, at least one or both sidewalls has a roughened or matte finish surface 36.

The narrow tapered portion of the groove 16, generally shown in FIG. 5, can be eliminated in some instances because of the improved gripping power of the compound angle, rough textured portion of the groove 14. Thus, in accordance with one aspect of the invention, the entire groove may have substantially the same compound angle sidewall cross-section extending from end to end of the groove. As indicated previously, the combination of angled sidewalls and matte textured surface on the sidewall improves the gripping power of the groove for a variety of yarns of different sizes thereby eliminating, in many instances, the necessity of also having a narrow angled portion of the groove 16.

Figure 7:
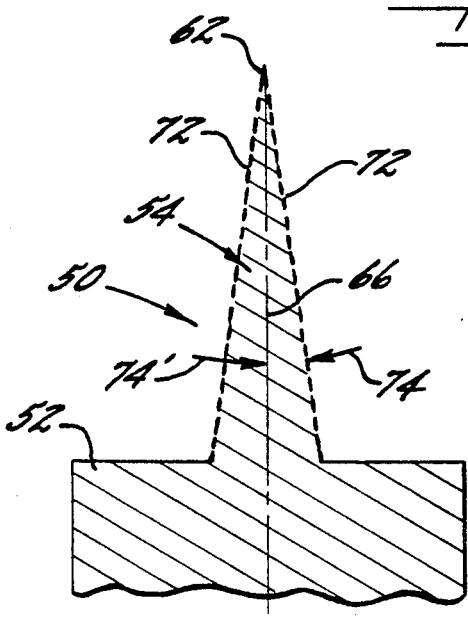
FIG. 7 is a fragmentary enlarged cross-sectional view taken along line 7—7 of FIG. 6 and illustrates the roughened simple angle blade surface used to form the trailing end of the yarn groove.
Figure 8:
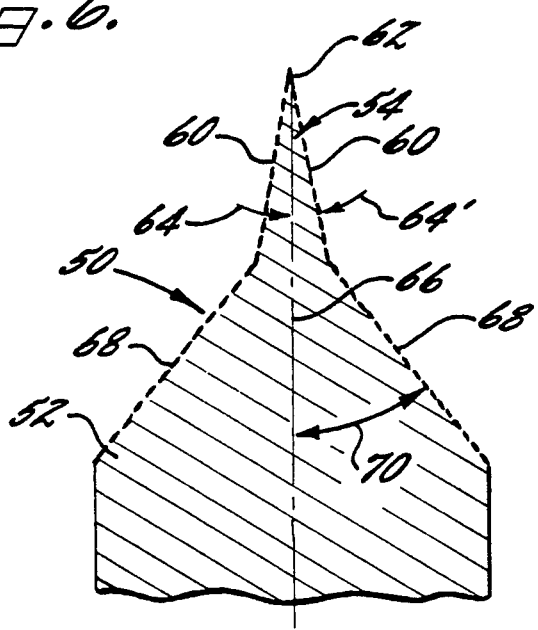
FIG. 8 is a fragmentary enlarged cross-sectional view taken along line 8—8 of FIG. 6 and illustrates the roughened compound angle portion of the blade surface used to form the lead-in portion of the groove.

FIGS. 6, 7 and 8 illustrate generally a preferred knife blade used in forming the textile cores of the invention and the process of forming the cores. As best seen in FIG. 6, the grooving blade 50 includes a substantially planar blade body 52 having two opposed sides and including a peripheral, arcuate, knife-like cutting edge 54. The peripheral cutting edge 54 includes a first longitudinal portion thereof, 56 having a compound cutting surface and a second longitudinal portion 58 having a simple taper cutting surface. The compound surface is best seen in FIG. 8 which illustrates a blade having compound cutting surfaces on both sides of the blade body. As seen in FIG. 8, each compound cutting surface is defined by a first cutting surface 60 adjacent the outer tip 62 of the cutting edge 54. The first cutting surface forms a first predetermined acute angle with the plane 66 of the blade body as generally indicated by arrows 64 and 64'. The compound cutting edge also includes a second cutting surface 68 which is spaced from the outer tip 62 of the cutting edge 54 and is adjacent the first cutting surface 60. The second cutting surface 68 forms a predetermined acute angle with the central plane 66 of the blade body as indicated by arrows 70. This acute angle is larger as compared to the angle formed by the first cutting surface 60 and the central plane 66 of the blade body. Both of the cutting surfaces 60 and 68 are illustrated as roughened.

The second longitudinal portion 58 of the peripheral cutting surface 54 of blade 50 is illustrated in FIG. 7. Each of the two cutting surfaces 72 on opposite sides of central plane 54 are simple angled surfaces. Each of the surfaces 72 forms a predetermined acute angle as generally indicated by arrows 74 and 74' with the central axis 54 of blade body 52. It will be apparent that the angles formed by the cutting surfaces 72, 60 and 68 of the various portions of the cutting edge of the blade correspond in substance to the angles of the sidewalls of the groove in the textile core as discussed previously in connection with FIGS. 4 and 5. It will also be apparent that one side of the peripheral cutting surface of the blade body can be substantially vertical when it is desired to form only a single angled sidewall groove in the textile core.

The knife blade 52 is used to form the groove 12 in core 10 using conventional apparatus as generally illustrated in FIG. 6. Thus, the knife blade 50 is attached to a rotating means 80 of a conventional type and brought into pressure contact with tube 10 which is also rotated by a means not shown. The knife blade is pressed into the tube body 10 during rotation of both the blade and the tube body to thereby form a multiple width start-up groove 12 in the tube body during a single operation. Although FIG. 6 illustrates rotation of the core 10 in the clockwise direction and rotation of the blade counter-clockwise, it will be apparent that these directions can be reversed. It will also be apparent that although knife blade 50 is shown having a curved surface, that blades having a straight surface can also be used. Similarly, although the knife blade 50 has an arcuate cutting surface which extends less than a full 360°, the blade 50 can readily be provided in the form of a circular cutting blade.

Figure 9:
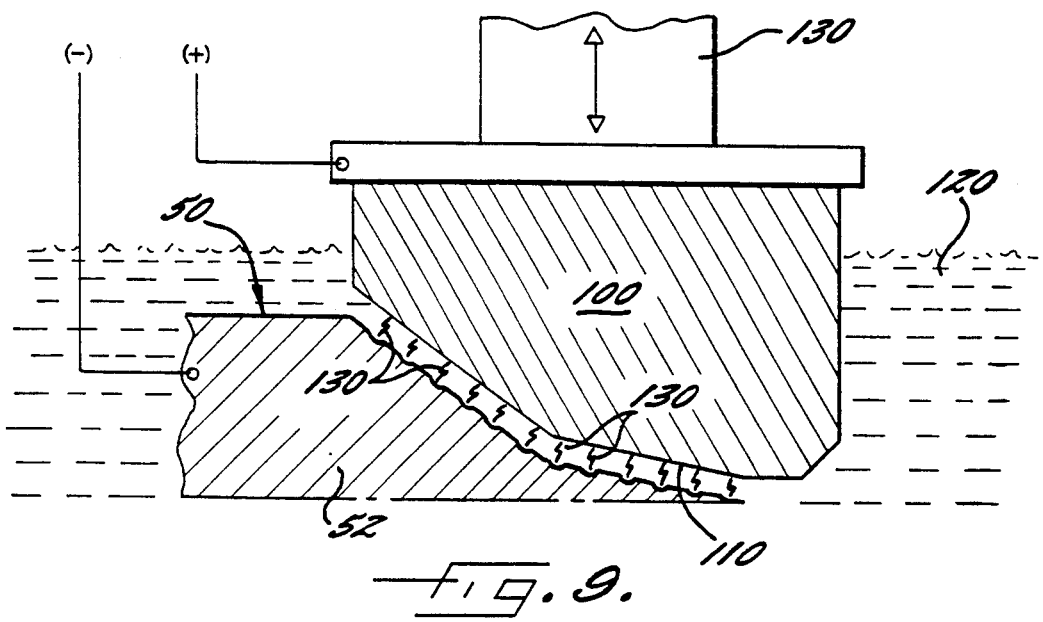
FIG. 9 schematically illustrates a preferred EDM process employed for forming grooving blades according to the invention.
Figure 11:
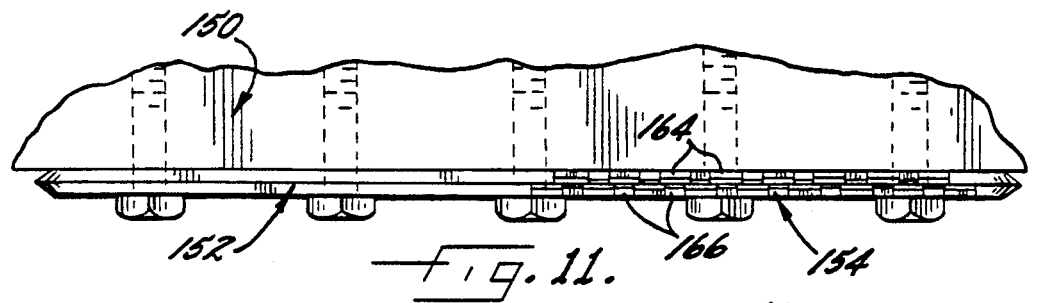
FIG. 11 is an enlarged top plan view taken along lines 11—11 of FIG. 10 and illustrates the compound blade surface of the grooving blade of FIG. 10.

A preferred EDM process employed in forming the knife blades of the invention is schematically shown in FIG. 9. An electrode 100 which has a shaped forming surface 110 is used to form the cutting surface on blade body 50. The electrode 110 and the blade body 50 are separated by an insulating dielectric medium 120. The electrode 100 is attached via a holder 130 which in turn is attached to a servo motor (not shown) for raising and lowering of the electrode so that it is adjacent the surface of the blade body 50. With a pulsed DC current applied between the electrode and the blade body 50, an increasing electrical stress is created on the dielectric fluid which results in the generation of a plurality of destructive sparks 130 which vaporize portions of the surface of the blade body forming a plurality of saucershaped craters on the surface thereof. The size of the indentations formed on the blade body is controlled by the power, i.e., amperage, applied to the electrode and by the cycle time, that is, the length of time that the electrode is switched on. The roughness of the finish on the surface of the blade is, in turn, determined by the size of the craters formed on the surface of the blade body.

In EDM processing, the surface roughness is measured on a "VDI" scale. In general, a VDI scale finish ranging from about 45 (very rough finish) to about 18 (less rough finish) can provide a suitably roughened groove surface. It will be apparent to the skilled artisan that the roughness imparted to the groove of a textile core by the roughened cutting surface of the blade will be dependant, at least in part, upon the material forming the textile core. Thus, the surface roughness of the cutting surfaces of the blade body can be adjusted, preferably within the limits discussed above, depending on whether a low density or high density paperboard core or a plastic textile core is contacted with the cutting surface of the blade. A preferred VDI roughness for the cutting surface of the blade when used on paperboard cores can range from about 30 to about 35, preferably about 32.

The EDM process employed to form grooving blades according to the invention provides numerous advantages as compared to grinding processes employed in the prior art. The EDM process can readily be employed to provide cutting blades having different cutting surfaces on different longitudinal portions of the blade cutting edge. Thus, blades having one longitudinal portion which comprises a compound cutting surface and a second longitudinal portion which comprises a simple cutting surface, substantially as shown in FIG. 6, can be readily formed by the EDM process. This, in turn, allows a double width start-up groove to be formed in a textile core in a single cutting operation. Moreover, the roughness of the blade surface can be readily controlled during the EDM process as described above. Thus, blades having roughened cutting surfaces of varying degrees can readily be formed. Still further, because the cutting surface of the blade matches the surface of the electrode, multiple blades having substantially identical cutting surfaces can readily be formed using the EDM process. As indicated previously, in addition to being more accurate, the EDM process is typically faster than a conventional grinding process, and the temper of the blade is not adversely affected during the EDM cutting edge forming process.

In one preferred embodiment of the invention, a blade substantially as shown in FIG. 6 is advantageously used to form grooves in textile tubes wherein the single tapered, narrower wall portions of the groove, each form an acute angle of 8° with the center plane of the groove, and wherein the compound wall portions of the groove form 10° and 40° angles with respect to the center axis of the groove. The cutting depth of the blade is approximately 0.19 inches. In the case of the compound wall portion of the groove, the wider tapered portion of the groove has a depth about twice that of the narrower portion of the groove; that is, the narrower, bottom portion of the groove is about ⅓ the groove height, whereas the upper, wider portion of the groove is about ⅔ the groove height. It will be apparent that groove depth will vary depending on wall thickness of the tube.

FIG. 10 illustrates a blade body 150 used to form a improved groove in a textile core body 10 according to a preferred aspect of the present invention. Blade 150 includes a first longitudinal portion 152 for forming the leading portion of the start-up groove and a second longitudinal portion 154 for forming the trailing portion of the start-up groove. The cutting surfaces of the blade body 150 are best seen in FIGS. 11, 12, 13 and 15. In FIG. 12, a vertical cross-section of longitudinal portion 152 of blade body 150 is shown. The two cutting edges 156 and 158 of portion 152 of the blade body, each form a simple angle cutting surface with respect to the center line 160 of the blade body. Preferably, the simple angle cutting surfaces 158 and 156 each have a relatively wide taper of, for example, between about 15° and 35° as indicated by angle 162, more preferably between about 25° and about 35° so that portion 152 of the blade body forms a relatively wide lead-in portion 163 of the start-up groove (FIGS. 14 and 18) discussed in greater detail below.

Figures 14, 15, 16, 17:
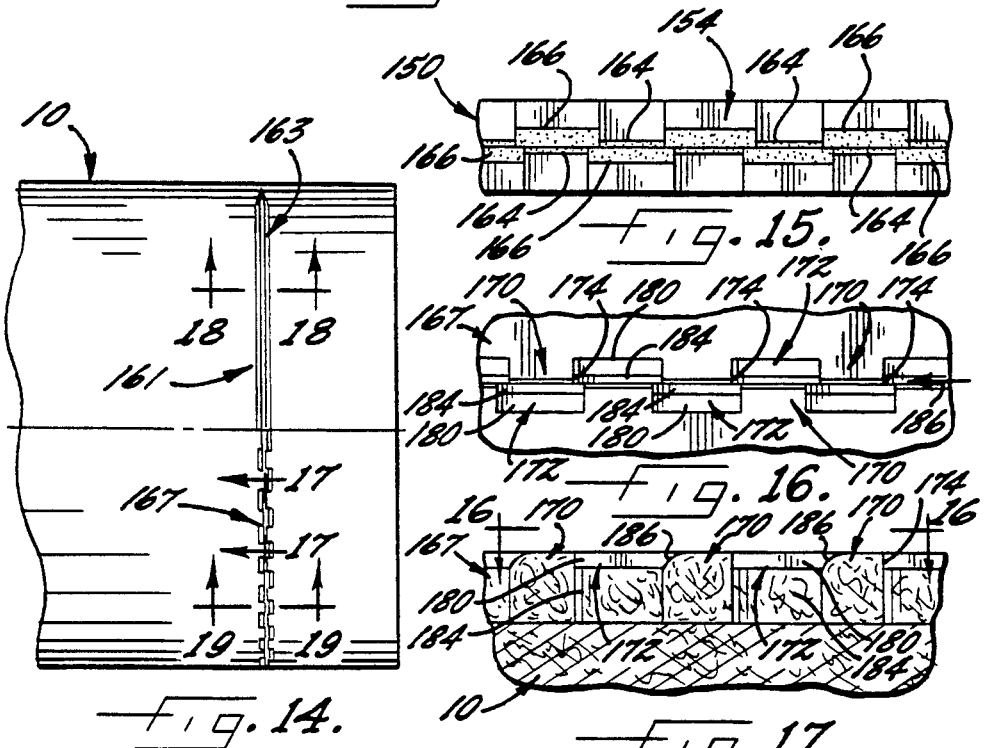
FIG. 14 is a fragmentary front plan view of a yarn core included a preferred start-up groove according to the invention and formed by the process illustrated in FIG. 10.
FIG. 15 is an enlarged fragmentary top plan view of the longitudinally complex grooving blade cutting surface illustrated in FIG. 11.
FIG. 16 is an enlarged fragmentary top plan view of a portion of the start-up groove illustrated in FIG. 14.
FIG. 17 is an enlarged fragmentary longitudinal cross-sectional view taken along line 17—17 of FIG. 14 and illustrates the longitudinal cross-section of the portion of the start-up groove shown in FIG. 16 thereby providing a fragmentary plan view of one sidewall thereof.

FIG. 13 illustrates the vertical cross-section of longitudinal portion 154 of blade body 150. In this portion of the blade body, the opposed cutting edges 164 and 166 are not symmetrical with respect to the center line 160 of the blade body. Instead, cutting edge 164 forms an angle of less than 10°, preferably 1°-5°, with the center line 160 of the blade body while opposed cutting edge 166 forms an angle of greater than 10°, preferably from about 10° to about 20° with respect to the center line 160 of the blade body. As best seen in FIG. 15, there are a plurality of narrow angle sections 164 on each side of the blade body 150. These narrow angle blade sections 164 alternate with wider angle cutting sections 166. Thus, each of the narrow angled cutting surfaces 164 is positioned in opposed relation to a wider angle cutting section 166 on the opposite side of the blade and each of the narrow angle cutting sections 164 alternates with a wide angle cutting section 166 on the same side of the blade.

Figure 18:
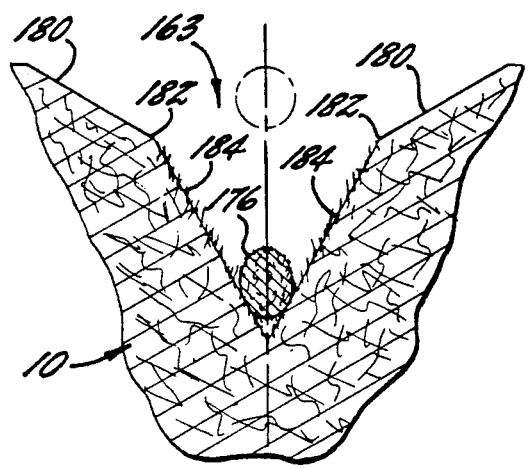
FIG. 18 is a vertical transverse cross-sectional view of the leading end of the start-up groove illustrated in FIG. 14 taken along the line 18—18 thereof.
Figure 19:
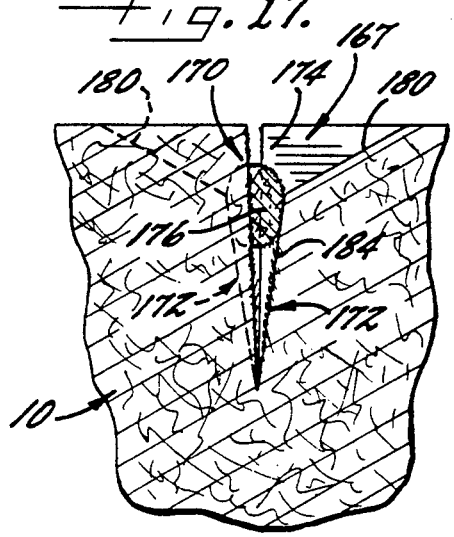
FIG. 19 is an enlarged fragmentary transverse cross-sectional groove of the trailing portion of the start-up groove illustrated in FIG. 14, taken along 19—19 thereof.

The start-up groove 161 formed by blade body 150 is seen in FIGS. 14, 16, 17, 18 and 19. As indicated previously, this groove includes a start-up portion 163 (shown in FIG. 18) and a longitudinally compound lead-portion 167 (FIGS. 16, 17 and 19). Preferably the leading start-up portion 163 has a width at the top thereof, which is substantially greater than the width of the longitudinal compound portion 163. This allows the yarn to enter into the leading portion 163 and thereafter to be engaged by the compound portion of the groove.

FIG. 19 illustrates in exaggerated detail a vertical cross-sectional view of the trailing portion 167 of groove 161. As shown in FIG. 19, a tongue section 170 is opposed to a notch section 172. The front wall of the tongue section 170 extends into the longitudinal start-up groove to a position which preferably is closely adjacent to the longitudinal center line thereof while the longitudinal wall of the opposed notch section 172 is set back from the center of the groove. Because tongue and notch sections 170 and 172 alternate on the same side of the groove, each of the tongue sections 170 present a leading, relatively sharp sidewall corner portion 174 which is believed to catch and help grasp the yarn bundle 176 within the start-up groove. In order that the tongues work most effectively, it is highly desirable that the longitudinal dimension of the tongue be substantially less than that of the opposed notch. This can greatly enhance the effectiveness of the sidewall corner for grasping the yarn.

It is to be noted that in the grooves shown in FIGS. 18 and 19, each of the grooves include a top shoulder section 180, which forms a different angle with the center line of the groove as compared to the bottom portion of the groove. This shoulder portion is believed to result from the pressing operation, wherein the knife blade is pressed into the tube body 10, taken in combination with the natural resiliency of paperboard material making up the tube body 10. With reference to FIG. 18, attention is drawn to junction points 182 between the shoulders 180 and the cut portion 184 of the yarn groove. During the groove forming operation, the point of the knife blade is pressed into the tube body 10, and the initiation of the groove begins at a single cut line, as indicated at points 182. As the knife blade is pressed into the body 10 of the tube, the sharp edge thereof makes a cut into the wall of the tube resulting in surfaces 184. At the same time, uncut portions 180 of the surface of the tube are pushed outwardly away from the blade, and downwardly into the groove by the compressive action of the knife blade entering and cutting into the body of the tube. Following a period of hours and/or days, the phenomenon of moisture regain, together with the natural resiliency of the paperboard body results in an expansion of the compressed paperboard on the opposed sides of the groove. This expansion process results in the compound shapes shown in FIGS. 18 and 19, wherein the shoulder portions 180 of the groove form a different angle with respect to the center line of the groove as compared to the cut portions 184 of the groove.

FIG. 16 is a top view of the trailing portion 167 of the start-up groove. It will be seen that each of the tongue portions 170 of the groove are positioned in opposed relation to notch portion of the groove on the other side thereof. Each notch includes a shoulder portion 180 an a cut portion 184. Moreover, it will be apparent that each of the tongue portions 170 extend nearly to the center line of the groove to thereby present alternating sharp corners 174 for a grabbing action on a yarn line which enters into the groove from the direction show by arrow 186 (FIG. 16).

FIG. 17 illustrates a longitudinal cross-sectional view of the trailing portion 167 of groove 161 and illustrates the alternating tongue and notch portions 170 and 172, respectively, on each side of the groove. As shown in FIG. 17, each of the notch sections 172 include a shoulder section 180 and cut portion 184. As also shown in FIG. 17, each of the tongue sections 170 include a rounded top corner 186 at the left-side thereof. This rounded corner section results from the direction of entry of the knife blade into the core body 10. The rounded corner section 186 is not as effective as the opposed sharp corner of the tongue 170 in grasping and incoming yarn line. Accordingly, the cutting operation should be conducted such that the knife blade enters into the core body from the direction of the leading end of the groove (FIG. 14) so that the rounded corner sections 186 are found on the trailing ends of each of the tongue sections 170.

In operation, a textile core or tube having the start-up groove configuration illustrated in FIG. 14, is placed on an appropriate winder and rotated so that the wide lead-in portion 163 of the groove forms the leading portion of the groove. The yarn typically enters this portion of the groove initially and thereafter is directed into the longitudinally compound portion of the groove 167. Upon entering into the longitudinally compound section 167, the yarn is grasped by the staggered tongues in the longitudinally compound section of the groove so that the yarn is securely grasped. This in turn, initiates the string-up process.

The exact configuration of the start-up groove as shown in FIG. 14 is susceptible to numerous variations and modifications. Thus, for example, in some instances, it may be desirable to eliminate the wide angled lead-in portion 163 of the groove. Alternatively, two wide lead-in longitudinal groove portions can be provided, one on each end of the longitudinally complex portion of the groove 167 as explained in greater detail in the previously mentioned U.S. Pat. No. 4,369,933 to Bedenbaugh and U.S. Pat. No. 4,371,130 to Case. Similarly, the tongues can be configured so that they extend a greater distance or a lesser distance into the groove; thus, the tongues can extend across and past the center line of the groove if desirable or can be spaced a greater distance from the center lines than illustrated in the drawings hereof. In addition, it can be desirable in some instances to provide only a few tongues, for example, 2-3 tongues on each side of the groove while in other cases each side of the groove can contain 20 or more of the tongues. Typically, each side of the groove can contain from about 5 to about 10 tongues.

The longitudinally convex blade illustrated in FIGS. 10, 11, 12, 13 and 15 is advantageously prepared by the EDM process described previously. In this case, the blade can be prepared in a single operation using an appropriately shaped EDM forming die; or alternatively, the blade can be prepared in two EDM operations. In the first operation, the first portion of the blade 152 is prepared while the trailing portion of the blade 154 is prepared in simple, straight angle form, so that each side of the blade in this section forms a simple knife edge of an appropriate taper. In the second operation, the notch or indented portions of the blade are formed using an appropriately shaped EDM forming die.

The invention has been described in considerable detail with reference to its preferred embodiments. It will be apparent, however, that numerous variations and modifications can be made without departure from the spirit and scope of the invention as described in the foregoing detailed specification and defined in the appended claims.

That which is claimed is:

1. A textile core comprising an elongate tubular body for supporting a yarn package and comprising:

a substantially circumferential groove for gripping an incoming yarn line for windup on said core, said groove being formed in at least a portion of the periphery of said tubular body adjacent at least one end thereof;

said groove having a generally V-shaped cross-section including an open top, a closed bottom and two sidewalls disposed on opposite sides of a center line extending radially into said tubular body, at least a first longitudinal portion of said groove having a first compound sidewall defined in longitudinal cross-section by a plurality of alternating tongue and notch sections extending along said first sidewall, said tongue and notch sections being substantially rectangularly shaped in top plan view, each of said tongue sections comprising a front wall which forms a portion of said first sidewall of said groove and extends substantially linearly from the top to the bottom of the groove, each of said tongue sections additionally comprising at least one sidewall extending substantially transversely into said groove for engaging said incoming yarn line.

2. The textile core according to claim 1, wherein said tubular body comprises paperboard.

3. The textile core according to claim 1, wherein said groove additionally comprises a second compound sidewall positioned in opposed relation to said first compound sidewall, said second compound sidewall being defined in longitudinally cross-section by a plurality of alternating, substantially rectangularly shaped tongue and notch sections extending along said sidewall, each of said tongue sections comprising a front wall which forms a portion of said second sidewall and a sidewall extending substantially transversely into said groove.

4. The textile core of claim 3 wherein the tongues of said first sidewall are positioned in opposed relationship to the notches on said second sidewall.

5. The textile core of claim 3 wherein each of said tongues on said first sidewall have a longitudinal dimension less than the longitudinal dimension of the notches on said second sidewall.

6. The textile core according to claim 4 wherein each of said tongues on said first sidewall have a longitudinal dimension less than each of said notches on said second sidewall and wherein each of said tongues on said second sidewall have a longitudinal dimension less than each of said notches on said first sidewall.

7. The textile core of claim 3 wherein the wall of each of said tongues on said first and second sidewalls is closely adjacent the longitudinal center line of said groove.

8. The textile core according to claim 6 wherein the front wall of each of said tongues is closely adjacent the longitudinal center line of said start-up groove.

9. The textile core of claim 3 wherein said start-up groove additionally comprises a second longitudinal portion adjacent said first longitudinal portion, said second longitudinal portion of said groove having opposed sidewall, at least one of said sidewalls being disposed at an angle of from about 20° to about 35° with respect to the center line of said groove.

10. The textile core of claim 9 wherein said first said second opposed sidewall of said second longitudinal portion of said groove is disposed at an angle from about 20° to about 35° with respect to the center line of said groove.

11. The textile core of claim 4 wherein said start-up groove additionally comprises a second longitudinal portion adjacent said first longitudinal portion, said second longitudinal portion comprising first and second opposed sidewalls, each of said sidewalls being disposed at an angle of from about 20° to about 35° with respect to said center line of said groove.

12. The textile core of claim 11 wherein the width of said second longitudinal portion of said start-up groove at a generally top portion thereof is substantially greater than the width of said first longitudinal portion of said start-up groove at a generally top portion thereof.

13. The textile core of claim 12 wherein said tubular body has a substantially cylindrical shape.

14. The textile core of claim 1 wherein said sidewall comprises between about 5 and about 15 of said tongue sections.

* * * * *